July 31, 1934.  C. W. FLOSS  1,968,288

VARIABLE SPEED TRANSMISSION

Filed Feb. 1, 1932  4 Sheets-Sheet 2

INVENTOR
Carl W. Floss

BY Whittemore Hulbert Whittemore
+ Belknap

ATTORNEYS

INVENTOR
Carl W. Floss

Patented July 31, 1934

1,968,288

UNITED STATES PATENT OFFICE

1,968,288

VARIABLE SPEED TRANSMISSION

Carl W. Floss, Detroit, Mich.

Application February 1, 1932, Serial No. 590,288

34 Claims. (Cl. 74—339)

This invention relates generally to variable speed transmissions of the selective gear type and is a continuation in part of my Patent 1,944,685, granted January 23, 1934.

The transmission forming the subject matter of this invention finds particular utility when employed in association with automobile vehicles wherein it is especially desirous to expediently and silently mesh several gears or clutch elements with the minimum effort and attention on the part of the operator.

The present invention contemplates securing the foregoing results by providing improved synchronizing mechanism fashioned to insure expedient synchronization of the several cooperating toothed elements prior to intermeshing the latter in all forward speeds as well as in reverse speeds.

Another object of this invention which contributes materially to the efficient operation of the synchronizing mechanism resides in the provision of means interposed between the driving and driven shafts and automatically operable upon disconnecting the transmission from the source of power to compel rotation of the two shafts at substantially the same peripheral speeds.

A further object of this invention which permits simplifying the construction of the transmission and reducing the size as well as the cost thereof to the minimum, resides in the provision of a single friction brake operable to synchronize all of the various speed changes either directly or indirectly and fashioned to reduce the time interval usually required to effect synchronization, with the result that the toothed elements may be more readily intermeshed with each other. By expediting intermeshing of the toothed elements as previously stated, acceleration of the vehicle may be more readily effected during the gear changing stages.

A further advantageous feature of this invention resides in the provision of means for interconnecting the synchronizing brake with the main clutch of the power unit so that each time the clutch is disengaged, the synchronizer is automatically operated. By reason of the foregoing construction, the operation of the synchronizer is effected independent of the transmission control lever with practically no effort on the part of the operator as distinguished from the usual types of synchronized transmissions wherein initial movement of the control lever by the operator actuates the synchronizing mechanism.

In addition to the foregoing, the present invention contemplates the provision of means for releasing the synchronizing mechanism just prior to intermeshing the toothed elements to effect the various gear ratios between the source of power and the driving wheels of the vehicle. This latter arrangement provides for the relative movement of the toothed elements necessary to properly intermesh the latter and accordingly, further facilitates changing the gear ratios in the transmission.

A further object of the present invention resides in the provision of means associated with the intermediate speed gear on the transmission shaft for preventing rotation of this gear relative to the shaft at a slower rate of speed than the latter prior to positively clutching the same together. As will be more fully hereinafter set forth, the aforesaid means permits the friction brake between the drive and driven shafts to indirectly synchronize the angular velocity of the intermediate speed gear on the driven shaft even though the same normally rotates at a different speed than the latter shaft.

A still further object of the present invention is to provide a latch for the gear shift lever releasable upon manipulation of another control and operable to positively hold the gear shift lever in the several positions of adjustment thereof. The foregoing arrangement is essential in the instances where the tension of the spring acting upon the synchronizer tends to relatively move the toothed elements out of mesh.

The foregoing as well as other objects will be made more apparent as this description proceeds, especially when considered in connection with the accompanying drawings, wherein:

Figure 3 is a similar view taken on the line 3—3 of Figure 1;

Figure 4 is a sectional view taken on the plane indicated by the line 4—4 of Figure 2;

Figures 6, 7 and 8 are cross sectional views taken respectively on the lines 6—6, 7—7 and 8—8 of Figure 1;

Figure 9 is a sectional side elevational view illustrating the transmission control means and latch mechanism therefor;

Figure 10 is a sectional view taken on the line 10—10 of Figure 9;

Figure 11 is a cross sectional view taken on the line 11—11 of Figure 9;

Figures 1, 2:
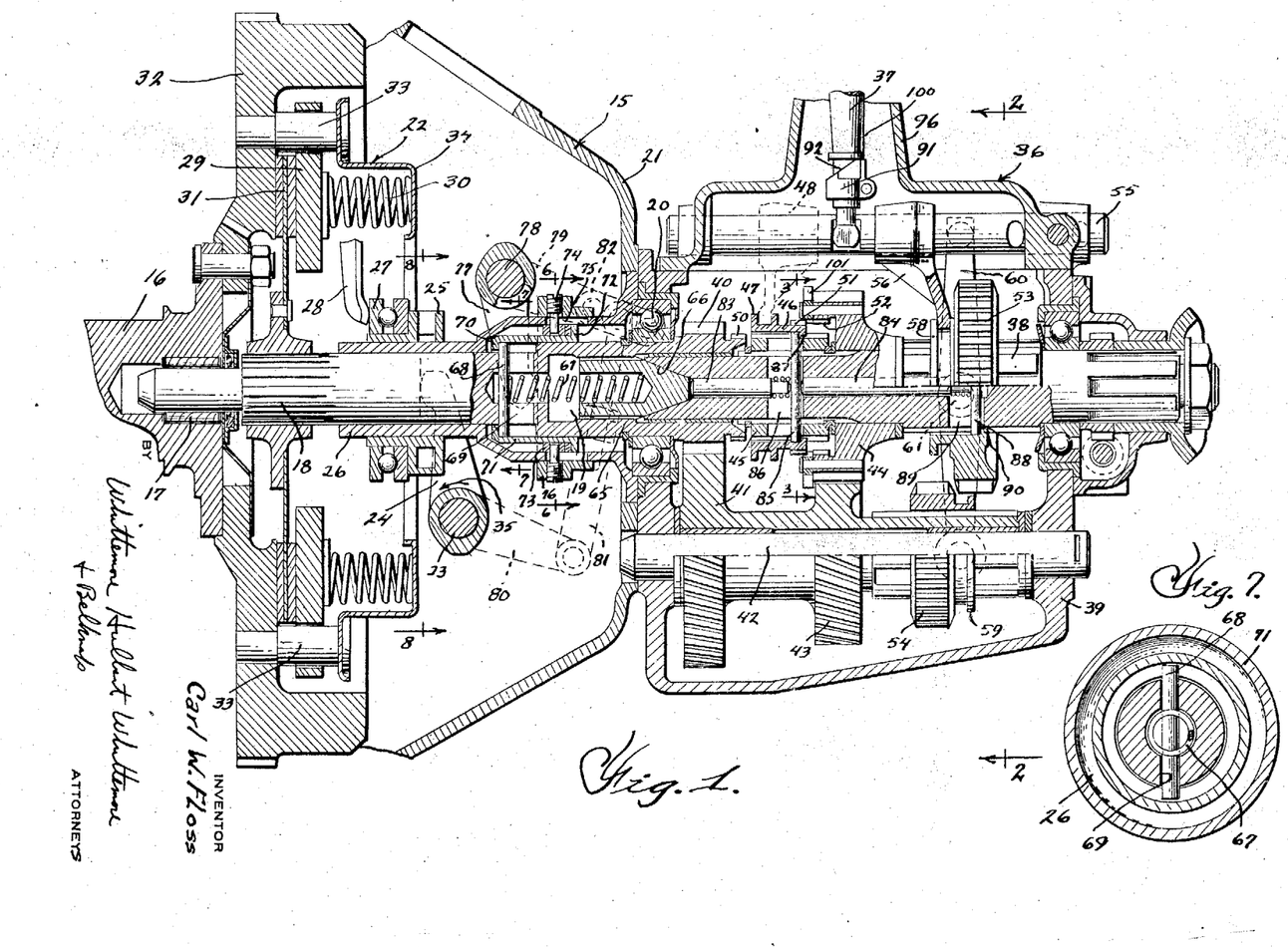
Figure 1 is a longitudinal sectional view through a variable speed transmission constructed in accordance with this invention and showing the same in connection with a conventional friction clutch.
Figure 2 is a cross sectional view taken on the line 2—2 of Figure 1.
Figures 2, 4, 6:
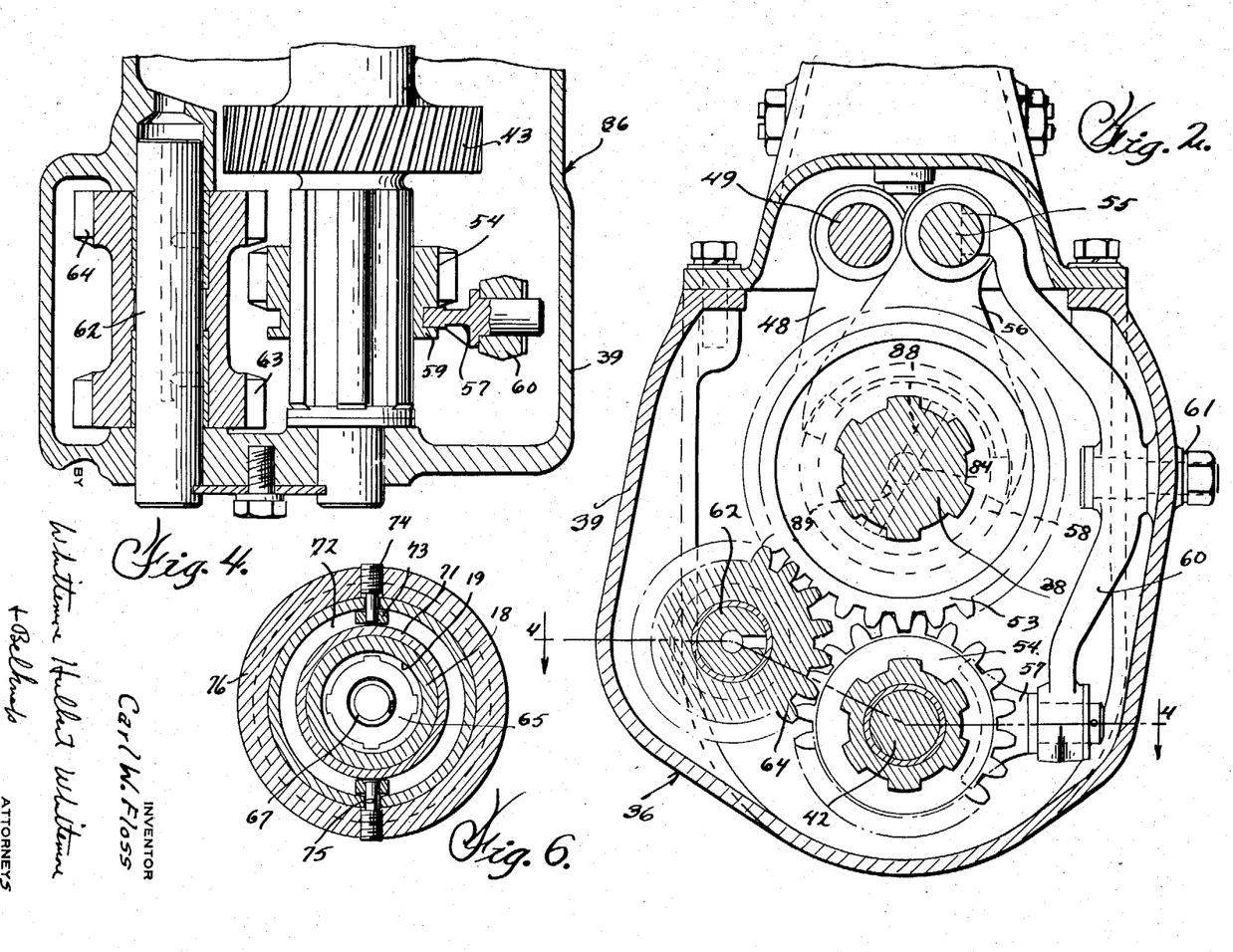

Referring now more in detail to the drawings, it will be noted that I have illustrated in Figure 1 a power unit 15 of the general type commonly employed in association with automobile vehicles for transmitting power from the motor of the vehicle and having a bearing 17 located within said unit comprises a power shaft 16 extending rearwardly from the motor (not shown) of the vehicles and having a bearing 17 located within the rear end thereof concentric with the axis of the same. Journaled within the bearing 17 for rotation relative to the power shaft is a clutch shaft 18 having an enlarged portion at the rear end thereof counterbored as at 19 and journaled within a bearing 20 supported in rear of the clutch housing 21. The clutch shaft is normally driven from the power shaft 16 by means of suitable clutch mechanism designated generally herein by the reference character 22 and located within the housing 21. The clutch mechanism employed may either be of the manual or automatic type and may be any one of a number of designs so long as it functions to operatively connect the clutch shaft with the power shaft and to release this connection when desired.

For the purpose of illustration, I have shown the clutch mechanism 22 as comprising in general a rockshaft 23 having one end operatively connected in any desirable manner to suitable actuating mechanism (not shown) and having a control lever 24 secured thereto for engaging a clutch collar 25 carried by the shaft 18 for axial sliding movement relative thereto. The clutch collar 25 is slidably mounted upon the forward end of a sleeve 26 surrounding the shaft 18 in concentric relation therewith and having an enlarged rear end portion fixed to the adjacent wall of the housing 21. The arrangement is such as to permit sliding movement of the collar axially of the shaft 18, but prevent rotation of this collar with the aforesaid shaft. Fixed to the collar 25 is a thrust bearing 27 engageable with the inner ends of the clutch release fingers 28 having the outer end portions suitably connected to a clutch release ring 29 for moving the same rearwardly against the action of the springs 30 out of engagement with the friction disk 31 of the clutch. The friction disk 31 is secured to the clutch shaft in the usual manner and is normally maintained in frictional engagement with the flywheel 32 on the power shaft through the medium of the ring 29 and springs 30. The clutch ring 29 is mounted for sliding movement axially of the clutch shaft 18 on suitable pins 33 extending rearwardly from the flywheel 32 and fixed to the latter for rotation therewith as a unit. The aforesaid pins also function to secure the retainer 34 for the springs 30 to the flywheel and since the latter springs normally maintain the friction disk 31 on the clutch shaft into engagement with the flywheel through the medium of the ring 29, it will be observed that the clutch shaft 18 will normally be driven by the power shaft 16. It will further be observed from the foregoing description that the driving connection between the power shaft 16 and clutch shaft 18 may be readily released by relieving the pressure on the friction disk 31 normally exerted by the springs 30. The above is readily accomplished in the present instance by rocking the shaft 23 in the direction of the arrow 35 and thereby causing the lever 24 to shift the collar 25 forwardly on the sleeve 26. Movement of the collar 25 in the aforesaid direction causes the thrust bearing 27 to move the inner ends of the fingers 28 in a forward direction and in so doing effect a rearward movement of the ring 29 against the action of the springs 30. Rearward movement of the ring 29 obviously releases the frictional engagement of the disk 31 with the flywheel and as a consequence, disconnects the clutch shaft from the power shaft.

In order to permit rotating the drive wheels (not shown) of the vehicle at different speeds from the power shaft 16, I provide a variable speed transmission designated generally herein by the reference character 36 and preferably having three different forward speed ratios and one reverse speed ratio selectively operated by a control lever 37 in a manner to be more fully hereinafter set forth. In detail, the transmission comprises a main drive shaft 38 having the forward end journaled within the counterbored portion 19 of the clutch shaft 18 and having the rear end suitably journaled in the rear wall of the transmission case 39. As is usually the case, the rear end portion of the drive or clutch shaft 18 is formed with a plurality of teeth 40 forming a gear arranged in constant mesh with a cooperating gear 41 fixed to the countershaft 42. The countershaft 42 is journaled within the case in any suitable manner and is provided with an additional gear 43 arranged in constant mesh with an intermediate speed gear 44 mounted upon the transmission shaft 38 for rotation relative thereto. Inasmuch as both the aforesaid sets of gears are arranged in constant mesh, the same may be of the helical type if desired so as to provide noiseless operation. Fixed to the transmission shaft 38 intermediate the rear end of the clutch shaft 18 and the second speed gear 44 is a sleeve 45 having a splined outer surface for slidably supporting a clutch member 46 having a portion 47 forming a collar for receiving a fork 48. The fork 48 is rigidly secured to the second and high speed rail 49 which in turn is mounted within the transmission case for axial sliding movement by the control lever 37. The arrangement is such that actuation of the control lever 37 to move the clutch member 46 forwardly causes the internal splines on the member 46 to mesh with corresponding splines 50 formed on the clutch shaft 18 in rear of the gear teeth 40. When the clutch member is in its forwardmost position as previously stated, a direct drive is effected from the power shaft through the clutch shaft to the transmission shaft. Movement of the clutch member 46 in the opposite direction causes the external and internal series of teeth 51 and 52, respectively, on the clutch member 46 and second speed gear to mesh and thereby connect the transmission shaft to the drive shaft 18 through the countershaft and associated gearing.

In order to permit rotating the driven or transmission shaft 38 at a slower rate of speed than either of the aforesaid ratios are capable of effecting, a relatively large gear 53 is splined upon the transmission shaft for sliding movement axially of the latter into and out of mesh with a cooperating gear 54 splined on the countershaft 42. As pointed out in my patent above identified, the low speed gears 53 and 54 are simultaneously moved on their respective shafts into and out of mesh with each other and this result is accomplished in the present instance in substantially the same manner as described with some particularity in the aforesaid patent. As shown in Figures 1 and 2, both of the low speed gears 53 and 54 are operatively connected to the low and reverse speed actuating rail 55 through the medium of the forks 56 and 57, respectively. The rail 55 is mounted for axial sliding movement within the transmission in juxtaposition to the rail 49 and is actuated in the usual way by the control lever 37. The fork 56 is secured to the rail 55 for movement therewith as a unit and engages a suitable collar 58 fixed to the low speed gear 53. The fork 57, on the other hand, engages a collar 59 formed on the low speed gear 54 and is carried by an oscillatable lever 60 at the lower end of the latter. The lever 60 is pivoted intermediate the ends as at 61 for oscillation and is suitably connected at the upper end to the rail 55. With the construction as thus far described, it will be noted that when it is desired to secure low speed operation, the rail 55 is merely moved forwardly by the control lever 37. Movement of the rail in the aforesaid direction causes a corresponding movement of the low speed gear 53 and through the oscillatable lever 60 effects a rearward movement of the low speed gear 54 until the two gears are in intermeshing relationship. The above arrangement obviously minimizes the extent of movement of the low speed gears necessary to mesh the same and thereby materially expedites the shift.

Figure 5:
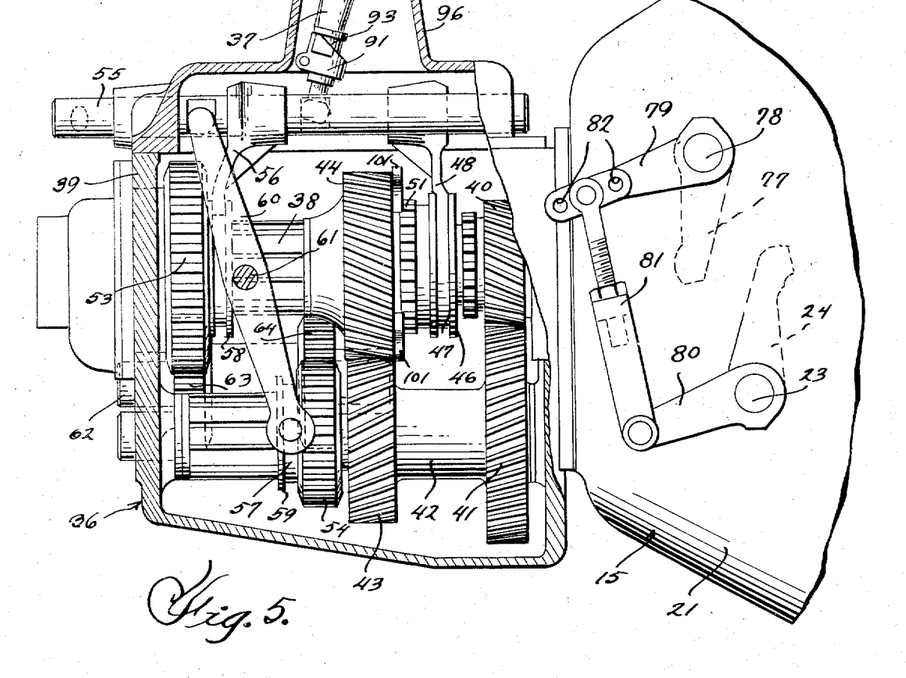
Figure 5 is a fragmentary side elevational view of the power unit with certain parts broken away for the sake of clearness.

For reversing the direction of rotation in the transmission, I provide an idler shaft 62 suitably journaled within the transmission case and having axially spaced sets of gear teeth 63 and 64 formed thereon. As shown particularly in Figure 5, the gear teeth 63 and 64 on the idler shaft are adapted to respectively mesh with the low speed gears 53 and 54 when the shifter rail 55 is moved in a rearward direction. In other words, the connection aforesaid between the shifter rail and cooperating low speed gears is such that movement of the rail in a rearward direction causes the low speed gear 54 to move forwardly into mesh with the idler gear 64 and effects a rearward movement of the low speed gear 53 into mesh with the cooperating idler gear 63. By reason of the above construction, the idler gears are in mesh only when reverse speed is effected, thereby eliminating wear and appreciably minimizing gear noises.

As previously stated, it is one of the principal objects of the present invention to provide means automatically operable upon releasing the clutch mechanism 22 to synchronize the speeds of the drive and driven shafts 18 and 38, respectively, and thereby synchronize all of the various change speed gear combinations prior to intermeshing the same. The foregoing is accomplished in the present instance by interposing a synchronizer or friction brake element 65 between the adjacent ends of the drive and driven shafts and interconnecting this element with the rockshaft 23 so that actuation of the latter to release the clutch mechanism also functions to move the synchronizer into operative position wherein it frictionally engages the forward end of the driven shaft 38. In detail, the element 65 is located within the counterbored portion 19 of the drive shaft 18 in advance of the forward end of the driven shaft 38 and is splined to the former shaft for axial sliding movement relative thereto. The rear end of the synchronizer is substantially frusto conical in shape for engaging a correspondingly shaped recess 66 formed in the forward end of the driven shaft 38. The operative connection mentioned above between the synchronizer 65 and rockshaft 23 comprises a tension spring 67 having the rear end extending within a recess formed in the forward end of the synchronizer and having the opposite end engaging a pin 68 extending transversely of the reduced portion of the drive shaft 18 as clearly shown in Figure 1. The pin 68 extends through a slot 69 formed in the drive shaft and elongated in the direction of the axis of the latter so as to provide for limited travel of the pin axially of the drive shaft. The opposite ends of the pin 68 extend laterally beyond opposite sides of the reduced portion of the shaft for engaging the rear sides of suitable shoulders 70 extending inwardly from the forward end of a sleeve 71 located within the enlarged rear end portion of the sleeve 26 hereinbefore described. The sleeve 71 is slidably mounted upon the enlarged portion of the drive shaft 18 and terminates at the rear end thereof in a radially outwardly extending flange 72 forming an abutment for the rollers 73 located within the sleeve 26 in advance of the flange 72. The rollers 73 are journaled upon the inner ends of pins 74 extending outwardly through elongated slots 75 formed in the enlarged portion of the sleeve 26 and anchored at the outer ends thereof within a collar 76 which in turn is mounted for sliding movement on the sleeve 26. The collar 76 is adapted to be engaged by the inner end of an actuating lever 77 having the outer end thereof fixed to a rockshaft 78 suitably journaled within the clutch housing. As will be observed from Figure 5, one end of the rockshaft 78 extends exteriorly of the clutch housing and has secured thereto a lever 79 operatively connected to the free end of a second lever 80 having the opposite end thereof fixed to the rockshaft 23. The connection between the free ends of the levers 79 and 80 comprises linkage 81 which is preferably adjustable for reasons to be presently set forth.

Referring now to the operation of the synchronizer 65 and with special reference to Figure 1, it will be noted that as the clutch actuating shaft 23 is rocked in the direction of the arrow 35 to release the clutch in the manner hereinbefore set forth, the lever 80 will also be rocked in a corresponding direction. Inasmuch as the lever 80 is connected to the rockshaft 78 through the linkage 79 and 81, the aforesaid shaft will also be rocked in a direction to cause the lever 77 to move the collar 76 rearwardly relative to the drive shaft 18. Movement of the collar 76 rearwardly effects a corresponding rearward movement of the sleeve 71 and transverse pin 68 carried by the latter. In view of the fact that the pin 68 forms an abutment for the forward end of the tension spring 67, it will be observed that movement of the pin rearwardly serves to progressively increase the tension of the springs 67 and thereby urge the synchronizer into frictional engagement with the driven shaft to synchronize the speed of the latter and the speed of the drive shaft. Thus, from the foregoing it will be observed that each time the main clutch mechanism 22 is released, the speeds of the drive and driven shafts are automatically synchronized prior to intermeshing the same. It will further be observed that the synchronizer 65 is actuated independent of the gear shift lever 37 offering the possibility of providing a more powerful synchronizing action without interfering in any way with the action of the manually controlled gear shift lever aforesaid.

Another advantageous feature of this invention resides in the provision of synchronizing mechanism of the type previously set forth so designed as to offer the minimum resistance to the prime mover when the latter is idling and the various toothed elements in the transmission are in their neutral positions. The foregoing feature is secured herein by accurately predetermining the length of the spring 67 so that when the parts are in the position shown in Figure 1, the same exerts a minimum pressure upon the synchronizer. In other words, when the clutch is engaged and the transmission is in neutral, the pressure exerted by the spring on the synchronizer tending to move the same into frictional engagement with the driven shaft is negligible.

The tension of the spring 67 may be accurately adjusted from a point exteriorly of the clutch housing by means of the adjustable connection 81 between the levers 79 and 80. As shown, the construction is such as to not only provide for varying the length of the connection 81, but to also permit varying the throw of the lever 79 by the rockshaft 23. This latter adjustment is secured by providing a plurality of spaced apertures 82 in the lever 79 for selectively receiving the upper end of the connection 81.

In order to facilitate meshing the clutch 46 with the drive shaft and to also expedite intermeshing of the low speed gears 53 and 54, means is provided herein for automatically relieving the frictional engagement of the synchronizer 65 with the driven shaft just prior to intermeshing either of the aforesaid toothed elements. The foregoing is accomplished herein by providing a pair of axially spaced plungers 83 and 84 within the driven shaft 38 having the adjacent ends thereof abutting opposite sides of a pin 85 extending transversely through an elongated slot 86 in the driven shaft and sleeve 45. The opposite ends of the pin 85 project beyond the sleeve 45 and extend into diametrically opposed tooth spaces in the clutch 46. As shown particularly in Figure 1, the rear end of the clutch 46 is provided with inwardly extending shoulders 87 adapted to engage the rear sides of the pin 85 so that upon forward movement of the clutch to intermesh the same with the drive shaft, the pin 85 engages the plunger 83 and effects a corresponding movement of the latter. The plunger 83 is of sufficient length to engage the rear end of the synchronizer 65, with the result that forward movement of the plunger by the clutch 46 effects a corresponding movement of the synchronizer against the action of the spring 67 and thereby disengages the same from the driven shaft 38. As previously indicated, the synchronizer 65 is also released from frictional engagement of the driven shaft when the low speed gears 53 and 54 are engaged, and this action is accomplished by a pin 88 extending transversely through an elongated slot 89 in the driven shaft in abutting relation to the rear end of the plunger 84. The outer ends of the pin 88 also project beyond opposite sides of the driven shaft and extend into the tooth spaces located in diametrically opposite sides of the low speed gear 53. This latter gear 53 is also provided with inwardly extending lugs normally engaging the projecting end portions aforesaid of the pin 88 so that movement of the low speed gear forwardly toward the cooperating low speed gear 54 on the countershaft effects a corresponding movement of the pin 88. Inasmuch as the pin 88 abuts the rear end of the plunger 84 and in view of the fact that the forward end of this plunger abuts the pin 85 hereinbefore described, it will be noted that as the low speed gear 53 is moved into mesh with the corresponding low speed gear 54, the plunger 83, through the medium of the pin 85, will release the frictional engagement of the synchronizer with the driven shaft. The above construction is so designed as to release the synchronizer in timed relation to movement of the aforesaid cooperating toothed elements into mesh so as to provide the desired relative rotation of these elements just prior to actually bringing the same into mesh.

With the arrangement as previously set forth, it will be observed that when either the clutch 46 or low speed gear 53 is in mesh with the cooperating toothed elements, the synchronizer spring 67 is under a slight tension due to the action of the releasing mechanism previously set forth. In other words, the spring 67 exerts a counteracting force upon the clutch 46 or low speed gear 53 through the plunger and pins set forth above tending to move the aforesaid elements out of mesh. Accordingly, it is desirable to provide some means for latching the clutch 46 and low speed gear 53 into mesh with their cooperating toothed elements. The above is accomplished herein by associating latch mechanism with the gear shift control lever operable to lock the latter in both low and high speed positions. In detail, the aforesaid means comprises a latch member 91 slidably mounted upon the lower end of the control lever 37 and having inclined cam faces 92 and 93 on opposite sides of the lever for engaging fixed pins 94 and 95 extending inwardly from opposite sides of the transmission tower 96. The inner end portions of the pins engageable with the cam surfaces 92 and 93 are inclined at an angle corresponding to the inclination of these surfaces and the relative positions of the pins is such that when the control lever is rocked laterally into engagement with the low speed rail 55 preparatory to shifting the latter, the cam surface 92 assumes a position inwardly beyond the pin so as to be free from interference therewith. Accordingly, when the gear shift lever is rocked into engagement with the high and second speed shifter rail 49 preparatory to actuating the latter, the cam surface 93 moves inwardly beyond the adjacent end of the pin 95, with the result that this latter pin does not obstruct movement of the lever. The latch member 91 is normally yieldably urged upwardly toward the pins 94 and 95 by means of a spring 97 located within the grip 98 of the lever 37 and engageable with a depressible plunger 99 normally extending beyond the upper end of the grip 98. The plunger 99 is secured in place against the reaction of the spring 97 thereon by means of a suitable rod 100 extending downwardly through a groove in the control lever and having the lower end fixed to the latch member 91.

With the construction described above, it will be seen that when it is desired to shift the low speed gear 53 into mesh with its cooperating low speed gear 54, the lever 37 is rocked laterally about its universal mounting with the tower 96 to engage the lower end thereof with the shifter rail 55. The lever is then rocked in a direction transverse to the aforesaid direction to move the shifter rail 55 forwardly and in so doing causes the pin 95 to move the latch member 91 downwardly against the action of the spring 97 until the lever has been moved past the pin 95 whereupon the latch member 91 is returned to its uppermost position by the spring 97 in advance of the pin 95. When the parts have assumed this latter position, the low speed gear 53 is in mesh with the cooperating low speed gear 54 and movement of the gear 53 by the reaction of the synchronizer spring 67 is prevented by engagement of the pin 95 with the end wall of the latch member 91. In this connection, it is to be noted that movement of the shifter rail 55 in the opposite direction to effect reverse speed is permitted independent of the latch mechanism since the member 91 merely travels in a direction away from the pin 95. When it is desired to move the cooperating low speed gears out of mesh, the plunger 99 is merely depressed causing a sufficient downward movement of the latch member to permit the control lever to assume its neutral position independent of the pin 95.

When it is desired to shift the clutch 46 into engagement with the teeth 50 on the drive shaft to effect direct drive, the control lever 37 is laterally rocked to engage the lower end thereof with the shifter rail 49 and to incidentally engage the inclined face 92 of the latch 91 with the corresponding face on the pin 94. The lever 37 is then rocked in a direction to move the shifter rail 49 and clutch 46 forwardly. Rocking movement of the lever 37 in this latter direction effects a corresponding movement of the latch 91 relative to the fixed pin 94 with the result that the former will be moved downwardly by the latter until the clutch member 46 is in engagement with the cooperating teeth 50 on the drive shaft at which time the latch member 91 assumes a position in advance of the pin permitting the spring 97 to return the same to its uppermost position wherein the pin 94 abuts the rear wall of the latch and prevents rearward movement of the rail 49. The latch mechanism is released from the above locked position in the same manner previously set forth by depressing the plunger 99 conveniently located on the grip 98 on the lever.

Figures 3, 8, 9, 10, 11:
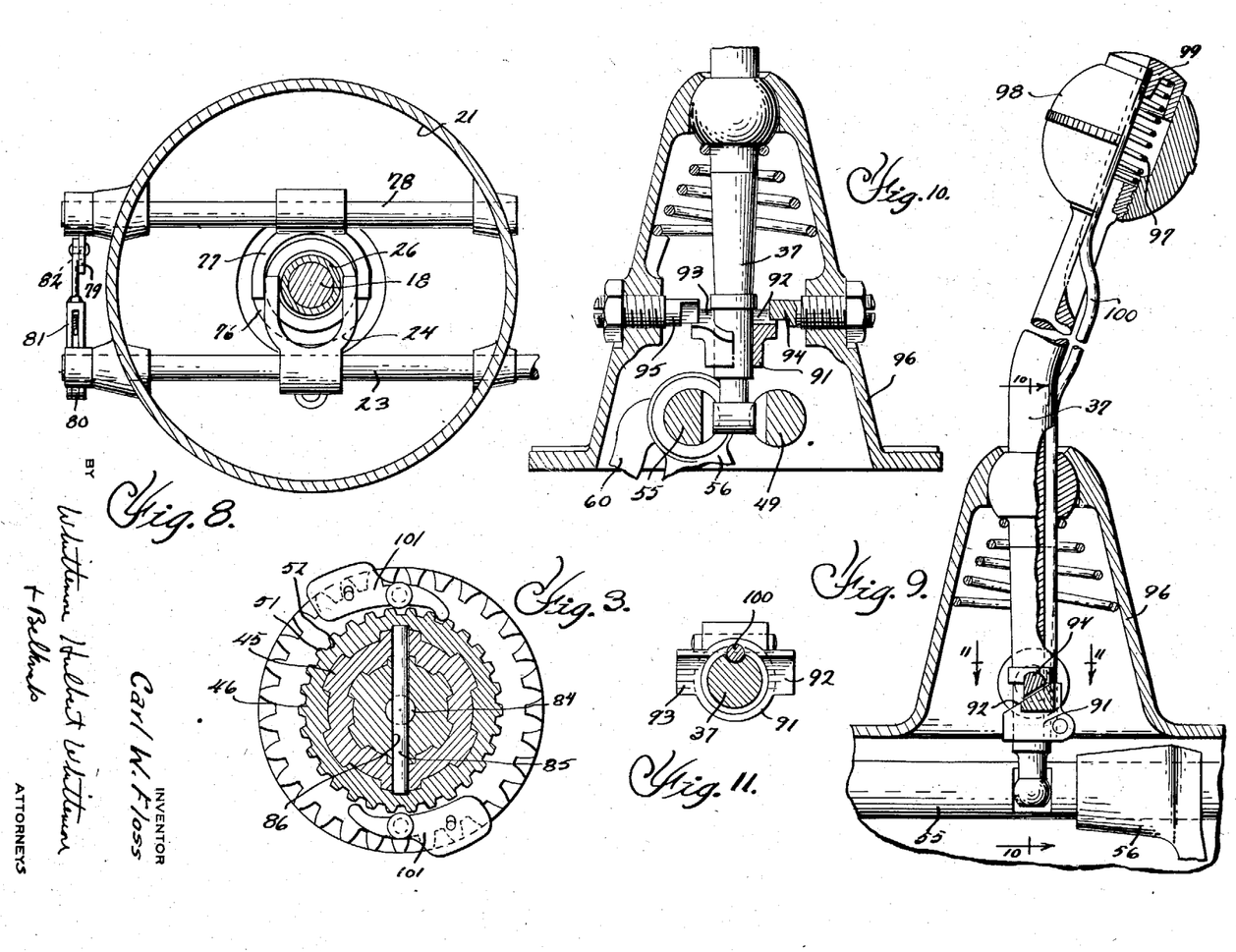

Referring now briefly to the manner in which the various speed combinations are secured in the transmission and assuming that its is desired to shift into low speed, the clutch mechanism 22 is first released by rocking the shaft 23 in the direction of the arrow 35. As previously stated, rocking movement of the shaft 23 to release the clutch also automatically moves the synchronizer 65 into frictional engagement with the end of the driven shaft 38 to equalize the speeds of the latter and drive shaft 18. However, since the vehicle is usually stationary when shifting into low speed, the driven shaft 38 is likewise stationary with the result that the synchronizer functions to arrest movement of the drive shaft and accordingly the countershaft 42. As soon as the clutch mechanism is released, the control lever 37 is manipulated to intermesh the low speed gears 53 and 54. Shifting of the low speed gear 53 in a direction toward the gear 54 automatically relieves the frictional engagement between the synchronizer and driven shaft just prior to meshing this gear with the cooperating gear 54, thereby permitting unobstructed and quiet engagement of these gears. As soon as the low speed gears are intermeshed, the clutch is engaged and the vehicle accelerated. When the desired momentum of the vehicle has been attained, the clutch is again released and the gear shift lever 37 manipulated to disengage the low speed gears and to clutch the intermediate speed gear 44 to the drive shaft 38. It is understood that before disengaging the cooperating low speed gears, the latch mechanism hereinbefore described is released by manipulation of the plunger 99 in the manner previously set forth. After the clutch mechanism 22 is released prior to disengaging the cooperating low speed gears, the synchronizer 65 is again actuated to equalize the speeds of the drive and driven shafts. However, since the intermediate speed gearing 45 is of a higher ratio than the low speed gearing, it will be noted that the intermediate speed gear 44 rotates at a greater rate of speed than the driven shaft subsequent to disengagement of the low speed gears. Accordingly, it is desirable to provide additional synchronizing means for the second speed gear 44. In the present instance, the additional synchronizing means is in the form of an overrunning clutch preferably of the ratchet type having dogs 101 pivotally connected to the second speed gear 44 at diametrically opposite sides thereof as shown particularly in Figure 3 of the drawings. The dogs are pivotally connected to the gear 44 intermediate the ends thereof and are centrifugally actuated to engage the forward ends of the same with the clutch teeth 51 on the rear end of the clutch member 46 when the latter is in its neutral position shown in Figure 1. The arrangement is such that the dogs overrun the teeth 51 during the interval the second speed gear 44 is rotating at a greater rate of speed than the driven shaft, but will positively engage these teeth as the angular velocity of the second speed gear diminishes to a speed less than the angular velocity of the driven shaft. Thus, it will be apparent that while the synchronizer 65 will function to diminish the speed of the intermediate gear 44 as the clutch mechanism 22 is released prior to shifting the clutch into engagement with the gear 44, the dogs 101 serve to prevent rotation of the gear 44 at a slower rate of speed than the driven shaft 38 or clutch member 46. In other words, as the intermediate speed gear 44 attempts to rotate at a slower rate of speed than the driven shaft 38, the dogs 101 will function to drive this gear from the cooperating clutch member 46, thereby synchronizing the speeds of the interengaging clutch teeth 51 and 52 respectively on the clutch 46 and gear 44. Inasmuch as the dogs are also accurately positioned to align the teeth 51 on the clutch 46 with the tooth spaces between the teeth 52 on the gear 54, it will be noted that these teeth may be readily interengaged without first releasing the synchronizing clutch.

As previously pointed out, high speed or direct drive is secured by moving the clutch 46 forwardly to engage the internal teeth thereof with the external teeth 50 on the rear end of the drive shaft. Synchronization of the relative speeds of the cooperating intermeshing teeth mentioned above is also accomplished by the synchronizer 65 upon releasing the clutch mechanism 22 preparatory to moving the clutch 46 into engagement with the drive shaft.

The synchronizer 65, in addition to synchronizing either directly or indirectly all of the forward speeds above described, further operates to synchronize reverse speed. Synchronization is effected in reverse speed in substantially the same manner as hereinbefore described in connection with low speed in that the synchronizer 65 serves to arrest movement of the countershaft gears preparatory to shifting the gear 54 and gear 53 into mesh with the idler gears 63 and 64.

Figure 12:
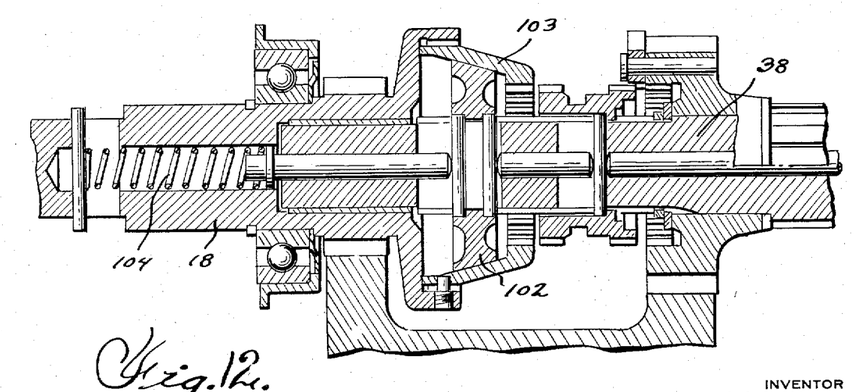
Figure 12 is a fragmentary longitudinal sectional view illustrating a slightly modified form of construction of synchronizer.

The modification of the invention illustrated in Figure 12 differs from the foregoing construction in that the synchronizer 102 is not confined within the drive shaft 18, but, on the other hand, is located within a conical enlargement 103 projecting from the rear end of the drive shaft and fixed to the latter. The synchronizer in the modified form of the invention is splined to the driven shaft 38 and is frictionally engageable with the inner surface of the enlargement 103. The synchronizer 102 is urged into frictional engagement with the enlargement 103 by means of a spring 104 located within the driven shaft 18 and operated by the clutch release mechanism in the same manner as the spring 67.

What I claim as my invention is:

1. The combination with driving and driven shafts, of change speed gearing operable to selectively connect the driven shaft to the drive shaft for rotating the former at different speeds from the latter, means for synchronizing the speeds of the two shafts prior to effecting different gear changes including, a member slidably and non-rotatably connected to one of said shafts frictionally engageable with the other shaft, yieldable means arranged to normally exert a minimum pressure on said member in a direction tending to urge the same toward the latter shaft, and means operable prior to intermeshing said change speed gears for automatically increasing the pressure exerted by said yieldable means on said member.

2. The combination with driving and driven shafts, of change speed gearing operable to selectively connect the driven shaft to the drive shaft for rotating the former at different speeds from the latter, a control for actuating said change speed gearing, means for synchronizing the speeds of the two shafts prior to effecting different gear changes including, a member slidably and non-rotatably connected to said drive shaft and frictionally engageable with the driven shaft, a coil spring arranged to normally exert a minimum pressure on said member in a direction tending to urge the same toward the driven shaft, and means independent of said control and operable prior to the actuation of the latter to effect the gear changing function for automatically increasing the tension of said spring.

3. In a power transmitting unit, a pair of cooperating toothed elements mounted for relative rotation at different speeds and also for relative sliding movement into and out of mesh, means for relatively moving said elements into and out of mesh, means operable independent of said first named means for automatically synchronizing the speeds of said elements during relative movement of said elements toward each other, and means for rendering the synchronizing means aforesaid inoperative just prior to intermeshing said elements.

4. In a power transmitting unit, a pair of cooperating toothed elements mounted for relative rotation at different speeds and also for relative sliding movement into and out of mesh, means for relatively moving said elements into and out of mesh, means operable independent of said first named means, for automatically synchronizing the speeds of said elements, and means operable, in dependence upon the operation of said first named means to relatively move the elements into mesh, for automatically rendering the synchronizing means inoperative just prior to intermeshing said elements.

5. In a power transmitting unit, a pair of cooperating toothed elements mounted for relative rotation at different speeds and also for relative sliding movement into and out of mesh, a releasable friction clutch for operatively connecting one of said elements to a source of power, a control operatively connected to said clutch for releasing the same, a second control for relatively moving said elements into mesh, means for synchronizing the speeds of said elements prior to meshing the latter, means establishing an operative connection between the first named control and said synchronizing means for automatically actuating the latter to synchronize the speeds of said elements upon operation of the first named control to release the clutch, and means operable in dependence upon actuation of said second named control for rendering said synchronizing means inoperative just prior to actually meshing said elements.

6. In a power transmitting unit, a drive shaft, a driven shaft, a releasable friction clutch between the drive shaft and a source of power, means for releasing the friction clutch, a synchronizer interposed between the adjacent ends of said shafts, means interconnecting the synchronizer with the means aforesaid for automatically actuating the latter to synchronize the speeds of said shafts upon actuation of said first named means to release the clutch and means for rendering the synchronizer inoperative after the shafts have been brought to substantially the same speed to permit a slight relative rotation thereof.

7. In a power transmitting unit, a drive shaft, a driven shaft in alignment with the drive shaft, a toothed element mounted on said driven shaft for axial sliding movement relative thereto into mesh with a cooperating toothed element driven by said drive shaft, means for synchronizing the speeds of said elements prior to meshing the same including a synchronizer interposed between the adjacent ends of said shafts and engageable therewith, means for actuating the synchronizer prior to intermeshing said elements, and means for automatically rendering said synchronizer inoperative just prior to meshing said elements.

8. In a power transmitting unit, a drive shaft, a driven shaft in alignment with the drive shaft, a toothed element mounted on said driven shaft for axial sliding movement relative thereto into mesh with a cooperating toothed element driven by said drive shaft, a releasable clutch operatively connecting said drive shaft to a source of power, means for releasing said clutch, means for synchronizing the speeds of said elements prior to meshing the same including a synchronizer carried by one of said shafts and frictionally engageable with the other shaft, means establishing a connection between the clutch releasing means and synchronizer for automatically moving the latter into frictional engagement with the shaft aforesaid upon actuation of said releasing means to disengage the clutch, and means operable in dependence upon movement of said toothed elements into mesh for rendering said synchronizer inoperative just prior to meshing said elements.

9. In a power transmitting unit, a drive shaft, a driven shaft in alignment with the drive shaft, a plurality of toothed elements slidably mounted on said driven shaft for meshing with cooperating toothed elements driven by said drive shaft, means for selectively actuating said toothed elements to bring the same into mesh, means for synchronizing the speeds of said toothed elements prior to meshing the same including a synchronizer interposed between the adjacent ends of said shafts and engageable therewith, means for rendering said synchronizer operative prior to movement of each of said toothed elements on the driven shaft into mesh with the cooperating toothed elements aforesaid, and means operated by the toothed elements just prior to intermeshing the latter for automatically rendering said synchronizer inoperative.

10. In a power transmitting unit, a drive shaft, a driven shaft in alignment with the drive shaft, a toothed element mounted on said driven shaft for axial sliding movement relative thereto into mesh with a cooperating toothed element driven by said drive shaft, a releasable clutch operatively connecting said drive shaft to a source of power, means for releasing said clutch, means for synchronizing the speeds of said elements prior to meshing the same including a synchronizer carried by one of said shafts and frictionally engageable with the other shaft, a tension spring normally exerting a minimum pressure upon the synchronizer tending to move the same into frictional engagement with said latter shaft, and a slidable anchorage for said spring operatively connected to said clutch releasing means for actuation thereby upon movement of the same to release the clutch to automatically increase the tension of said spring and thereby move the synchronizer into frictional engagement with said second named shaft.

11. In a power transmitting unit, a drive shaft, a driven shaft in alignment with the drive shaft, a toothed element mounted on said driven shaft for axial sliding movement relative thereto into mesh with a cooperating toothed element driven by said drive shaft, a releasable clutch operatively connecting said drive shaft to a source of power, means for releasing said clutch, means for synchronizing the speeds of said elements prior to meshing the same including a synchronizer splined to said drive shaft and frictionally engageable with the driven shaft, a tension spring normally exerting a minimum pressure upon the synchronizer tending to move the same into frictional engagement with said driven shaft, a slidable anchorage for said spring operatively connected to said clutch releasing means for actuation thereby upon movement thereof to release the clutch to automatically increase the tension on the spring and thereby move the synchronizer into frictional engagement with said second driven shaft, and means operated by the toothed elements just prior to movement of the same into mesh for moving the synchronizer against the action of said spring out of engagement with the driven shaft.

12. A variable speed transmission having a series of cooperating relatively slidable toothed elements for effecting a plurality of different forward speeds, means for selectively meshing said cooperating elements, means operable independent of the means aforesaid for synchronizing the speeds of all of said elements prior to meshing the same and means for rendering the synchronizing means inoperative just before the teeth of said elements are brought into mesh.

13. In a power transmitting unit, a drive shaft, a driven shaft, a toothed element slidably mounted on the driven shaft for meshing with a cooperating toothed element driven by the drive shaft, means for relatively moving said elements to bring the same into mesh, means for synchronizing the speeds of the toothed elements prior to meshing the same including a synchronizer slidably and non-rotatably carried by one of said shafts, yieldable means operable to exert a pressure on said synchronizer for urging the same into frictional engagement with the other shaft, means operable upon movement of one of the toothed elements into mesh with the other to engage the synchronizer and move the same against the action of said yieldable means out of engagement with the last named shaft, and means for rendering the reaction of said yieldable means on said latter element inoperative to move the elements out of mesh.

14. In a power transmitting unit, a drive shaft, a driven shaft, a toothed element slidably mounted on the driven shaft for meshing with a cooperating toothed element driven by the drive shaft, a control for relatively moving said elements to bring the same into mesh, means for synchronizing the speeds of the toothed elements prior to meshing the same including a synchronizer slidably and non-rotatably carried by one of said shafts, yieldable means operable to exert a pressure on said synchronizer for urging the same into frictional engagement with the other shaft, means operable upon movement of one of the toothed elements into mesh with the other to engage the synchronizer and move the same against the action of said yieldable means out of engagement with the last named shaft, means for rendering the reaction of said yieldable means on said latter element inoperative to move the elements out of mesh including a latch operable to lock the control aforesaid in a position wherein said elements are in mesh and means for releasing said latch.

15. In a variable speed transmission, a driven shaft, a toothed element mounted upon the driven shaft for rotation relative thereto, and means synchronizing the speed of the element relative to the speed of the shaft including mechanism between the toothed element and shaft compelling rotation of the element at a speed at least as great as the speed of the shaft and preventing rotation of the element at a speed slower than that of the shaft.

16. In a variable speed transmission, a driven shaft, a toothed element mounted upon the driven shaft for rotation relative thereto, and means for synchronizing the speed of the element relative to the speed of the shaft including a one-way clutch operable to permit rotation of said element at a speed greater than the speed of the shaft and to prevent rotation of the element at a speed slower than the speed of the shaft.

17. In a variable speed transmission, a driven shaft, a toothed element mounted upon the driven shaft for rotation relative thereto and fashioned to mesh with a cooperating toothed element driven at substantially the same speed as the shaft, and means for synchronizing the speeds of the two elements prior to meshing the same including one-way clutch means cooperating with said elements to compel rotation of the first named element at a speed at least as great as the speed of the second mentioned element.

18. In a variable speed transmission, a driven shaft, a toothed element mounted upon the driven shaft for rotation relative thereto and fashioned to mesh with a cooperating toothed element non-rotatably mounted on said shaft, and means for synchronizing the speeds of said elements prior to meshing the same including dogs fixed to said first named element and engageable with the teeth on the other of said elements prior to meshing said teeth with the teeth of the first mentioned element.

19. In a power transmitting unit, a pair of cooperating toothed elements mounted for relative rotation at different speeds and also for relative sliding movement into and out of mesh, a control for relatively moving said elements into mesh, means operable upon manipulation of another control for synchronizing the speeds of said elements prior to meshing the same and means operable in timed relation to relative movement of said elements into mesh for rendering said synchronizing means inoperative.

20. In a power transmitting unit, a pair of cooperating toothed elements mounted for relative rotation at different speeds and also for relative sliding movement into and out of mesh, a releasable friction clutch operatively connecting one of said elements to a source of power, a control for actuating the clutch, means for synchronizing the speeds of said elements prior to meshing the same rendered operative by manipulation of said control and means for rendering said synchronizing means inoperative just prior to engagement of the teeth of said elements.

21. In a power transmitting unit, a pair of cooperating toothed elements mounted for relative rotation at different speeds and also for relative sliding movement into and out of mesh, means for relatively moving said elements into and out of mesh, means for synchronizing the speeds of the elements prior to meshing the same, means other than said first named means for rendering the synchronizing means operative and means for rendering the synchronizing means inoperative just prior to intermeshing the teeth of said elements in order to permit a slight relative rotation thereof.

22. In a power transmitting unit, a pair of cooperating toothed elements mounted for relative rotation at different speeds and also for relative sliding movement into and out of mesh, means for synchronizing the speeds of rotation of the two elements as the latter are relatively moved toward each other, and means operated by one of said elements just prior to meshing with the other of said elements to render said synchronizing means inoperative.

23. In a power transmitting unit, a pair of cooperating toothed elements mounted for relative rotation at different speeds and also for relative sliding movement into and out of mesh, means for synchronizing the speed of rotation of the two elements prior to intermeshing said elements, means operated by one of said elements just prior to meshing with the other of said elements to render said synchronizing means inoperative, and means for preventing axial displacement of the last named element when the same is in intermeshing relationship with the cooperating toothed element aforesaid.

24. A power transmitting unit for vehicles comprising a variable speed transmission having a plurality of shafts, a gear slidably mounted upon one of said shafts and adapted to mesh with a corresponding gear slidably mounted upon another of said shafts, a pair of axially spaced relatively fixed gears secured upon still another of said shafts and fashioned to mesh with the first and second named gears aforesaid, and means operatively connected to both the first and second named gears for simultaneously sliding both the latter axially of their respective shafts in directions toward each other to intermesh the same and in directions away from each other to respectively mesh the first named gear with one of the gears of said fixed pair of gears and to mesh the second named gear with the other gear of said fixed pair of gears.

25. In a power transmitting unit, a pair of aligned shafts, one of said shafts having a tubular portion at the end thereof adjacent the other of said shafts, a synchronizer slidably and non-rotatably mounted in the tubular portion of the first named shaft for frictionally engaging the adjacent end of the second named shaft, yieldable means normally urging said synchronizer in position with respect to the second named shaft, and means for moving said synchronizer into frictional engagement with the end of the second named shaft to rotate the latter at substantially the same speed as the first mentioned shaft.

26. In a power transmitting unit, a pair of aligned shafts, a releasable friction clutch normally connecting one of the shafts to a source of power for rotating the latter shaft, one of said shafts having a tubular portion at the end thereof adjacent the other of said shafts, a synchronizer slidably and non-rotatably mounted in the tubular portion aforesaid for frictional engagement with the adjacent end of the other shaft, a spring normally urging the synchronizer in position relative to the latter shaft, and means automatically operable upon releasing the friction clutch for increasing the tension of said spring and thereby urging the synchronizer into frictional engagement with said last named shaft to rotate both shafts at substantially the same speed.

27. In a power transmitting unit, a pair of aligned shafts, one of said shafts having a tubular portion at the end thereof adjacent the other of said shafts, a synchronizer slidably and non-rotatably mounted in the tubular portion aforesaid for engaging the second mentioned shaft, means for moving said synchronizer into engagement with said latter shaft to rotate both shafts at substantially the same speed, and means for subsequently moving said synchronizer out of engagement with the second mentioned shaft to provide for relative rotation of the shafts.

28. In a power transmitting unit for vehicles comprising, a variable speed transmission having a plurality of shafts, a gear mounted upon one of said shafts, a second gear mounted upon another of the shafts, a third gear mounted upon still another of the shafts, a fourth gear fixed upon the latter shaft against axial displacement relative thereto, means mounting certain of said gears on their respective shafts permitting axial displacement of these gears relative to the latter shafts to intermesh the first and second named gears and to respectively and simultaneously intermesh the latter gears with the third and fourth mentioned gears.

29. In a power transmitting unit for vehicles comprising, a variable speed transmission having a plurality of shafts, a gear mounted upon one of said shafts, a second gear mounted upon another of the shafts, a third gear mounted upon still another of the shafts, a fourth gear fixed upon the latter shaft against axial displacement relative thereto, means mounting certain of said gears on their respective shafts permitting axial displacement of these gears relative to the latter shafts to selectively intermesh the first and second named gears with each other and to respectively mesh the latter gears with the third and fourth gears at substantially the same time.

30. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear also mounted on the latter shaft and fixed against axial displacement relative thereto, means mounting certain of said gears on their respective shafts permitting axial displacement of these gears relative to the shafts, a common gear shift control member, and means connecting said control to the shiftable gears whereby movement of the control in one direction effects an intermeshing of the first and second named gears and movement of the control in another direction effects an intermeshing of the first and second named gears with the third and fourth mentioned gears.

31. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear mounted upon the latter shaft and fixed against axial displacement relative thereto, means mounting the second named gear on its shaft permitting axial shifting movement of the former relative to the latter in one direction to mesh said second mentioned gear with the first named gear and in the opposite direction to mesh the second gear with said fourth mentioned gear, and means providing relative shifting of said first and third named gears to effect intermeshing of the same.

32. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear mounted upon the latter shaft and fixed against axial displacement relative thereto, means mounting the second named gear on its shaft permitting axial shifting movement of this gear relative to the latter shaft in one direction to mesh said second named gear with the first named gear and in the opposite direction to mesh this second named gear with the fourth mentioned gear, and means operable at the same time said second named gear is moved into mesh with the fourth named gear to effect relative shifting of the first and third named gears to intermesh the same.

33. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear mounted upon the latter shaft and fixed against axial displacement relative thereto, means mounting the second gear on its shaft for axial shifting movement relative to this shaft in one direction to mesh the second gear with the first named gear and in the opposite direction to mesh the second gear with said fourth mentioned gear, means providing for relative shifting of said first and third gears to effect intermeshing of the same, a gear shift control element, and a connection between the gear shift control element and said slidable gears whereby movement of the element in one direction effects an intermeshing of the first and second named gears and movement of the control in another direction effects simultaneous meshing of the second gear with the fourth gear and the first gear with the third gear.

34. A power transmitting unit for vehicles comprising, a variable speed transmission having a plurality of shafts, a gear slidably mounted upon one of said shafts and adapted to mesh with a gear mounted upon another shaft to effect rotation of the latter shaft in one direction, a third gear mounted upon still another shaft, a fourth gear mounted upon the latter shaft and fixed against axial displacement relative thereto, said third and fourth gears being respectively intermeshable with the first and second named gears to effect rotation of the second named shaft in a reverse direction, and a common control element for selectively intermeshing the first and second named gears and for respectively intermeshing these latter gears with the third and fourth gears.

CARL W. FLOSS.

DISCLAIMER 1,968,288.—*Carl W. Floss*, Detroit, Mich. VARIABLE SPEED TRANSMISSION. Patent dated July 31, 1934. Disclaimer filed June 13, 1938, by the patentee.
Hereby enters this disclaimer to claims 28 to 34 inclusive.
[*Official Gazette July 5, 1938.*]

displacement of these gears relative to the latter shafts to selectively intermesh the first and second named gears with each other and to respectively mesh the latter gears with the third and fourth gears at substantially the same time.

30. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear also mounted on the latter shaft and fixed against axial displacement relative thereto, means mounting certain of said gears on their respective shafts permitting axial displacement of these gears relative to the shafts, a common gear shift control member, and means connecting said control to the shiftable gears whereby movement of the control in one direction effects an intermeshing of the first and second named gears and movement of the control in another direction effects an intermeshing of the first and second named gears with the third and fourth mentioned gears.

31. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear mounted upon the latter shaft and fixed against axial displacement relative thereto, means mounting the second named gear on its shaft permitting axial shifting movement of the former relative to the latter in one direction to mesh said second mentioned gear with the first named gear and in the opposite direction to mesh the second gear with said fourth mentioned gear, and means providing relative shifting of said first and third named gears to effect intermeshing of the same.

32. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear mounted upon the latter shaft and fixed against axial displacement relative thereto, means mounting the second named gear on its shaft permitting axial shifting movement of this gear relative to the latter shaft in one direction to mesh said second named gear with the first named gear and in the opposite direction to mesh this second named gear with the fourth mentioned gear, and means operable at the same time said second named gear is moved into mesh with the fourth named gear to effect relative shifting of the first and third named gears to intermesh the same.

33. A power transmitting unit for vehicles comprising, a variable speed transmission having a plurality of shafts, a gear mounted upon one of said shafts, a second gear mounted upon another of the shafts, a third gear mounted upon still another of the shafts, a fourth gear mounted upon the latter shaft and fixed against axial displacement relative thereto, means mounting the second gear on its shaft for axial shifting movement relative to this shaft in one direction to mesh the second gear with the first named gear and in the opposite direction to mesh the second gear with said fourth mentioned gear, means providing for relative shifting of said first and third gears to effect intermeshing of the same, a gear shift control element, and a connection between the gear shift control element and said slidable gears whereby movement of the element in one direction effects an intermeshing of the first and second named gears and movement of the control in another direction effects simultaneous meshing of the second gear with the fourth gear and the first gear with the third gear.

34. A power transmitting unit for vehicles comprising, a variable speed transmission having a plurality of shafts, a gear slidably mounted upon one of said shafts and adapted to mesh with a gear mounted upon another shaft to effect rotation of the latter shaft in one direction, a third gear mounted upon still another shaft, a fourth gear mounted upon the latter shaft and fixed against axial displacement relative thereto, said third and fourth gears being respectively intermeshable with the first and second named gears to effect rotation of the second named shaft in a reverse direction, and a common control element for selectively intermeshing the first and second named gears and for respectively intermeshing these latter gears with the third and fourth gears.

CARL W. FLOSS.

DISCLAIMER 1,968,288.—*Carl W. Floss*, Detroit, Mich. VARIABLE SPEED TRANSMISSION. Patent dated July 31, 1934. Disclaimer filed June 13, 1938, by the patentee.
Hereby enters this disclaimer to claims 28 to 34 inclusive.
[*Official Gazette July 5, 1938.*]